Dec. 20, 1955     C. A. PINKERTON     2,727,721
CONDUCTOR WIRE GUIDE

Filed Feb. 24, 1954

Clarence A. Pinkerton
INVENTOR.

United States Patent Office 2,727,721
Patented Dec. 20, 1955

2,727,721

CONDUCTOR WIRE GUIDE

Clarence A. Pinkerton, Manville, Wyo.

Application February 24, 1954, Serial No. 412,294

1 Claim. (Cl. 254—134.3)

The present invention relates to new and useful improvements in wire guides for use particularly by electricians and has for its primary object to provide, in a manner as hereinafter set forth, a tool of this character which will greatly expedite the threading of insulated conductor wires into or out of junction boxes or outlets etc., without kinking or damaging the insulation.

Other objects of the invention are to provide an electrician's wire guide tool of the aforementioned character which will be comparatively simple in construction, strong, durable, compact, light in weight, portable and which may be manufactured at low cost.

All of the foregoing and still further objects and advantages of the invention which will become apparent from a study of the following specification, taken in connection with the accompanying drawing, wherein like characters of reference designate corresponding parts throughout the several views, and wherein.

Figure 1:
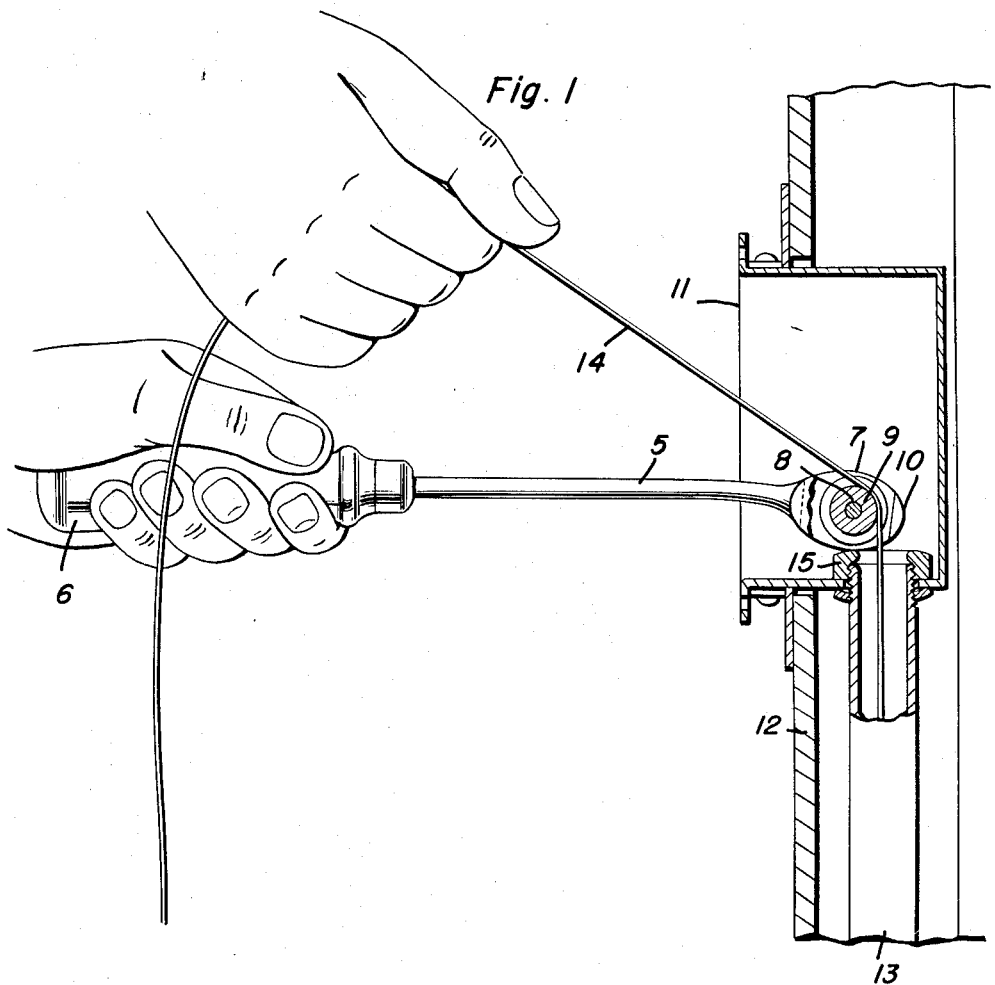
Figure 1 is a view partially in side elevation and partially in vertical section showing a tool constructed in accordance with the present invention in use.

Referring now to the drawing in detail, it will be seen that the embodiment of the invention which has been illustrated comprises a metallic shank or rod 5 of suitable length and diameter. Fixed longitudinally on one end portion of the shank 5 is an elongated handle 6. Formed integrally with the other end of the shank 5 and projecting forwardly therefrom is a pair of spaced, opposed, substantially flat, oval plates 7.

Figure 2:
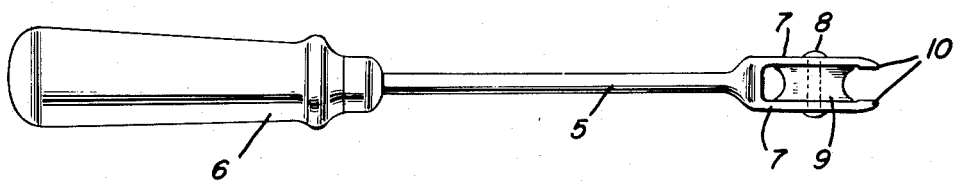
Figure 2 is a plan view of the device.

Extending between the plates 7 is a headed pin or shaft 9 of suitable metal. A peripherally grooved pulley or wheel 9 is journaled on the shaft 8 for rotation between the plates 7. As illustrated to advantage in Figure 2 of the drawing, the plates 7 project forwardly beyond the pulley 9 and terminate in substantially rounded, inturned bumper or guard portions 10.

It is thought that the manner in which the tool is used will be readily apparent from a consideration of the foregoing. Briefly, in Figure 1 of the drawing, reference character 11 designates a conventional outlet box installed in the usual manner in a wall 12 and having connected thereto a conduit 13. A fish or snake wire or cable is shown at 14. Of course, one end of the wire 14 is connected to the insulated conductor wire (not shown) to be pulled through the conduit 13 into the outlet box 11. To accomplish this, the mechanic, gripping the handle 6 in one hand, inserts the tool in the outlet box 11 and engages the plates 7 with the usual anchoring nut 15 on the conduit 13 in the manner shown. With the other hand, the mechanic trains the wire 14 over the grooved pulley 9. With the wire 14 substantially centered in the conduit 13, said wire and the insulated conductor wire connected thereto may be expeditiously pulled through the conduit 13 into and out of the outlet box 11 without kinking or damaging said conductor wire and with a minimum of effort. Any kinks in the wire that resist the progress of the wire through the conduit may be reduced or eliminated by rocking the tool with the oval plate 7 bearing on the end of the conduit while holding the wire trained over the pulley under tension. The bumpers or guard 10 prevent the pulley 9 from contacting the walls of the outlet box 11 or other portions of the installation.

It is believed that the many advantages of a conductor wire guide constructed in accordance with the present invention will be readily understood and although a preferred embodiment of the tool is as illustrated and described, it is to be understood that changes in the details of construction may be resorted to which will fall within the scope of the invention as claimed.

What is claimed as new is as follows:

A portable wire pulling hand tool usable in combination with outlet boxes having wire conduits connected thereto in intersecting relationship to a sidewall portion of said boxes, said wire pulling hand tool comprising a pivotal shank, a pair of spaced, substantially oval plates on an end of the shank disposed with the minor axis transversely of the longitudinal axis of the shank, said oval plates having a lower edge portion engageable with and rockable adjacent the end of the conduit contained in an outlet box, a peripherally grooved rotatable guide pulley journalled between the plates engageable with a conductor wire being drawn through said conduit, a longitudinally projecting bumper element integral with a forward end portion of the plates and engageable with an outlet box maintaining a spaced relationship of the pulley relative to the back of said box, and a handle element at the other end of the pivotal shank for manipulating the implement into an outlet box for positioning an outer peripheral edge portion of said pulley in overlying alignment with the longitudinal axis of the wire conduit and for rocking the oval plates on the end of the conduit to draw out any kinks in the wire, thereby causing the wire to be readily drawn through said conduit.

References Cited in the file of this patent

UNITED STATES PATENTS

| 303,749 | Pyle | Aug. 19, 1884 |
| 565,052 | Thompson | Aug. 4, 1896 |
| 728,823 | Adams | May 26, 1903 |
| 1,027,090 | Waxbom | May 21, 1912 |
| 1,237,787 | Kashian | Aug. 21, 1917 |
| 1,322,371 | Taylor | Nov. 18, 1919 |